United States Patent Office 3,748,311
Patented July 24, 1973

3,748,311
HETEROCYCLIC ENDO ALICYCLIC END
CAPPED RESINS
Eugene A. Burns, Palos Verdes Peninsula, and Robert J.
Jones, Hermosa Beach, Calif., assignors to TRW Inc.,
Redondo Beach, Calif.
No Drawing. Filed Apr. 3, 1972, Ser. No. 240,800
Int. Cl. C08g 20/00, 20/32, 20/38
U.S. Cl. 260—78.4 R     15 Claims

ABSTRACT OF THE DISCLOSURE

Resins having high temperature stability can be made by curing chemically stable alicyclic endo end capped aromatic prepolymers. The prepolymers can be made by reacting proper stoichiometric amounts of an aromatic dicarboxylic derivative with a polyfunctional substituted aromatic amine, such as a tetraamine, dithioldiamine, or a dihydroxydiamine, and an end capping compound having the formula

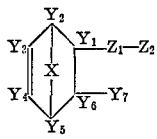

wherein $Y_1$–$Y_6$, inclusive, can be hydrogen, halogen, nitro, aryl, alkyl, alkyl ether, or alkaryl; X can be carbonyl, oxygen, sulfur, methylene, halogen substituted methylene, alkyl substituted methylene, or aryl substituted methylene; $Z_1$ can be an arylene radical or an alkylene group having 0 to 4 carbon atoms; $Z_2$ can be an acid group, an acid halide, an amine, or an ester group; and $Y_7$ can be hydrogen, halogen, nitro, aryl, alkyl, alkyl ether, alkaryl, or amino in a stable combination with $Y_6$. The end capping compound can be synthesized by reacting a cyclodiolefin with an olefinic compound according to a Diels-Alder reaction.

BACKGROUND OF THE INVENTION

The present invention relates to stable, high temperature aromatic resins. Resins, according to this invention, are produced by a pyrolytic polymerization of prepolymers having reactive terminal groups. Pyrolytic polymerization is the coreaction of the reactive groups located at the terminal ends of the prepolymer upon heating at elevated temperature to cause chain extension and crosslinking of the prepolymer segment.

Polyimide resins have been produced by the pyrolytic polymerization reaction of a polyimide prepolymer having end caps of bicyclo(2.2.1)hept-5-ene-2,3-anhydride as disclosed in U.S. Pat. 3,528,590. The polyimide prepolymer was produced by reacting a diamine with a dianhydride and capping the chain with a monoanhydride having the structure:

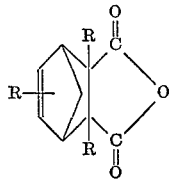

where R is hydrogen or an alkyl group.

Synthesis of compounds similar to the alicyclic endo compounds used herein have been disclosed by Diels and Alder in U.S. Pat. 1,944,731. These compounds are produced by reacting a diene with a dienophile to produce a six membered ring compound.

SUMMARY OF THE INVENTION

The high temperature aromatic resins of this invention are produced by reacting a polyfunctional aromatic diamine compound with an aromatic dicarboxylic derivative and end capping the polymer chain with a substitute alicyclic endo compound. The polyfunctional substituted alimatic diamine may be a tetraamine where the polyfunctional substituents are the four amino groups, a dithioldiamine where the polyfunctional substituents are the two amino and the two thio groups, or a dihydroxydiamine where the polyfunctional substituents are the two hydroxyl groups and the two amino groups. The polymer chain which is produced by reacting stoichiometric amounts of the diacid and polyfunctional diamine is end capped with a substituent alicyclic endo compound having the formula:

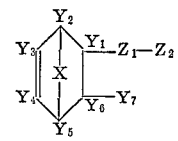

wherein $Y_1$–$Y_6$, inclusive, may be selected from hydrogen, halogen, nitro, aryl, alkyl having 1 to 6 carbon atoms, alkyl ether having 1 to 6 carbon atoms, or alkaryl; X may be selected from any of carbonyl, oxygen, sulfur, methylene, halogen substituted methylene, alkyl substituted methylene, or aryl substituted methylene; $Z_1$ is an arylene radical or an alkylene radical having 0 to 4 carbon atoms; $Z_2$ may be selected from any of:

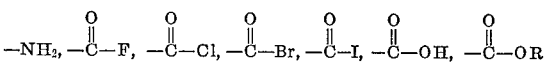

where R is a monovalent aliphatic or aromatic radical; and $Y_7$ can be selected from any of hydrogen, halogen, nitro, aryl, alkyl, alkyl ether, alkaryl, or amino.

The end capping endo compound is produced by a Diels-Alder reaction wherein a cyclodiolefin having a formula:

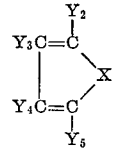

wherein $Y_2$–$Y_6$, inclusive, may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene-alkyl substituted methylene, and aryl substituted methylene is reacted with an olefinic compound having the formula:

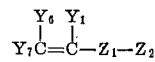

wherein $Y_7$ may be selected from any of hydrogen, halogen, nitro, aryl, alkyl having 1 to 6 carbon atoms, alkyl ether having 1 to 6 carbon atoms, alkaryl; $Y_1$ may be selected from any of halogen, nitro, aryl, alkyl, alkyl ether, alkaryl, and amino; $Z_1$ is an arylene radical or an alkylene radical having 0 to 4 carbon atoms; and $Z_2$ may be selected from any of:

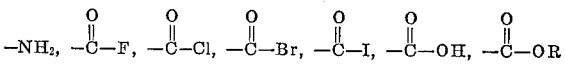

where R is a monovalent aliphatic or aromatic radical.

The prepolymers of this invention may be made by reacting a diacid with a tetraamine, a dithioldiamine, or a dihydroxydiamine and end capping the prepolymer with an alicyclic endo compound. The prepolymer which may be produced by the reaction of the diacid with a tetra-amine may be illustrated ideally as follows:

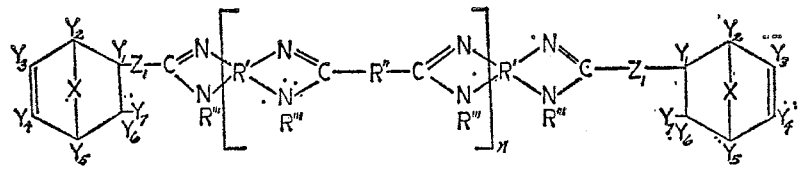

where X, $Y_1$–$Y_7$, and $Z_1$ have been previously identified, R' is a tetravalent aromatic radical, R" is a divalent aromatic radical, R'" is hydrogen or a monovalent aliphatic radical having 1 to 4 carbon atoms, and the $n$ is an integer from 1 to 20.

If the proportions of the ingredients are reversed and an alicyclic endo diamine compound is used for the end cap, the prepolymer may be illustrated ideally as follows:

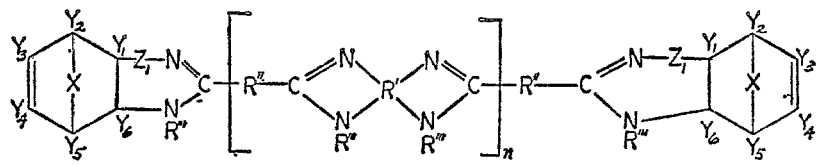

wherein X, $Y_1$–$Y_7$, $Z_1$, R', R", and R'" may be the same as in the prepolymer illustrated above.

Where the dihydroxy amine is reacted with the diacid and end capped with an alicyclic endo mono acid, the prepolymer may be illustrated ideally as follows:

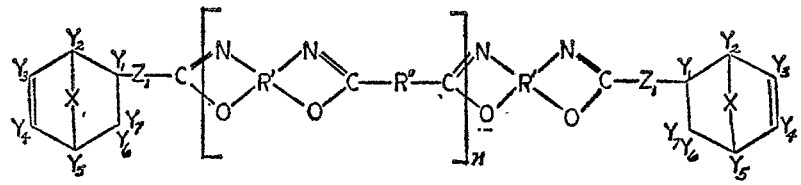

where R', R", X, $Y_1$–$Y_7$, $Z_1$, and $n$ are the same as set forth for the drawing above.

Where an aromatic dithiol diamine is reacted with an aromatic diacid and end capped with an alicyclic endo mono acid, the prepolymer may be represented ideally as follows:

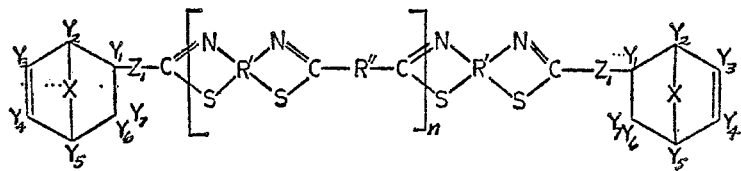

where R', R", $E_1$, $E_2$, and $n$ are the same as set forth in the drawing above.

DISCLOSURE OF THE INVENTION

High temperature resins can be made by curing prepolymers prepared by reacting stoichiometric amounts of an aromatic dicarboxylic acid with a polyfunctional substituted aromatic diamine and end capping the prepolymer with an alicyclic endo compound. The prepolymers are characterized in that they are shelf-stable solids which react through the alicyclic endo compound to form a polymer having good properties in the temperature range of 280°–370° C. One of the chief advantages of these resins, in addition to their excellent physical and thermal properties, is the relative ease with which laminated or molded articles may be fabricated from them. Thus, rather than fabricating articles from a liquid resin, fabricators may form the solid prepolymers of this invention from the liquid starting materials and fabricate the articles from a dry or slightly tacky prepolymer. The savings in cleanup time and materials is substantial without sacrifice of product properties.

Alicyclic endo end cap compounds are synthesized by reacting a cyclodiolefin having the formula:

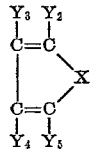

wherein $Y_2$–$Y_5$, inclusive, may be selected from any of hydrogen, halogen, nitro, alkyl having 1 to 6 carbon atoms, alkyl ether having 1 to 6 carbon atoms, or alkaryl; and X may be selected from any of carbonyl, oxygen, sulfur, methylene, substituted methylene, alkyl substituted methylene, or aryl substituted methylene, with an olefinic compound having the formula:

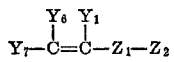

wherein $Y_6$ and $Y_1$ is selected from the same groups represented by $Y_2$–$Y_5$; $Y_7$ is selected from the same groups as represented by $Y_2$–$Y_5$ and additionally, may represent an amido radical; $Z_1$ is an arylene radical or an alkylene radical having 0 to 4 carbon atoms; and $Z_2$ may be selected from any of:

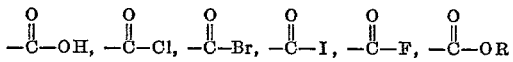

where R is a monovalent aliphatic or aromatic radical, and $-NH_2$. Ideally, the reaction may be represented as follows:

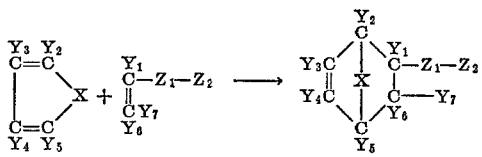

wherein $Y_1$–$Y_7$, X, $Z_1$, and $Z_2$ have been identified above. The reaction as carried out is a liquid solvent, such as benzene, and temperatures of the reaction may range from room temperature to about 200° F.

Special note should be made of the alicyclic endo diamine compound because it can be synthesized, for instance, by Curtius reaction, rather than by Diels-Alder reaction. According to the Curtius reaction, an alicyclic endo diacid or derivative is reacted with ammonia or hydrazine according to the following reaction:

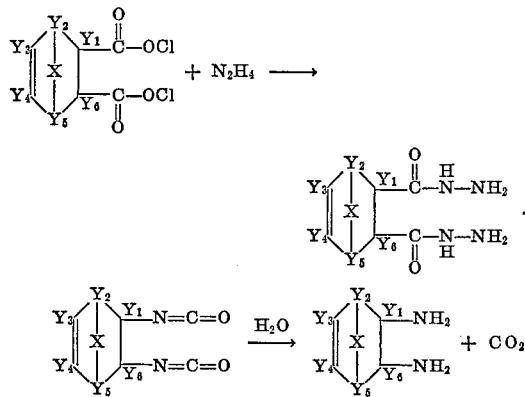

TABLE I
furane
cyclopentadieneone
3,4-diphenylthiophene
cyclopentadiene
methylcyclopentadiene
1,1,2,3,4,5-hexachlorocyclopentadiene The following table provides a list of a few of the representative olefinic compounds which are suitable for reaction to produce the alicyclic endo end cap compound.

TABLE II
acrylic acid
2-methylacrylic acid
cinnamic acid
crotonic acid
2,3,3-trichloroacrylic acid One of the resins according to this invention may be produced by reacting proper stoichiometric amounts of an aromatic tetraamine with an alicyclic endo mono acid at temperatures ranging from about 10° C. to about 200° C., and subsequently, or simultaneously, the mixture is reacted with an aromatic diacid in the presence of a dehydrating agent at temperatures ranging from about −18° C. to about 200° C. The reaction may be illustrated ideally as follows:

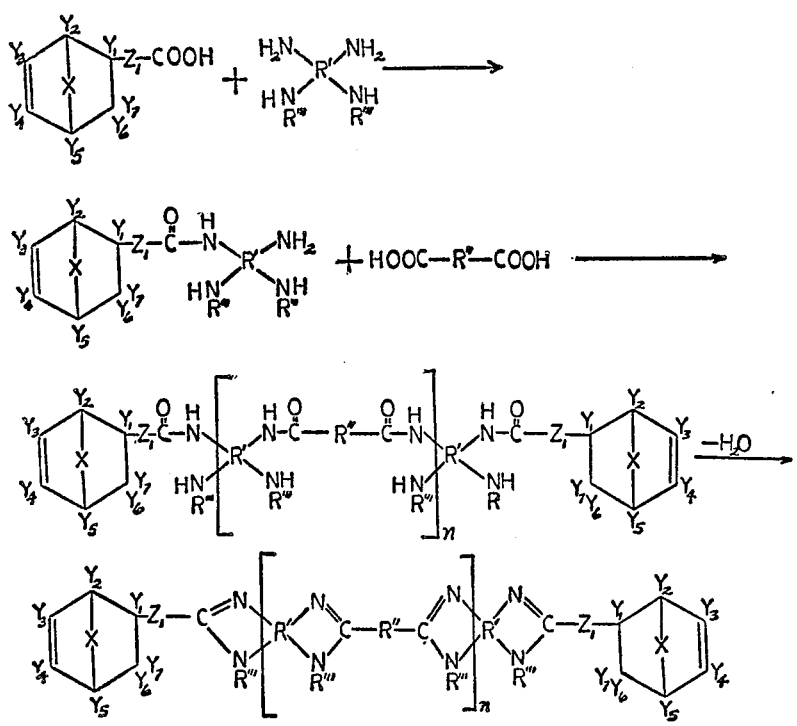

The following table provides a list of a few of the representative cyclodiolefin compounds which are suitable for reaction to produce the alicyclic endo end cap compounds.

wherein $Z_1$, $Y_1$–$Y_7$, and X have been previously identified. R' is a tetravalent aromatic radical, R" is a divalent aromatic radical, R''' is hydrogen, a monovalent aliphatic radical having 1 to 6 carbon atoms, or a monovalent aromatic radical, and $n$ is an integer from 1 to 20. The end cap compounds may be the same or different trivalent alicyclic endo mono acids or derivatives. As an alternative, up to about 50% of the alicyclic endo mono acid can be replaced by acrylic acid which, in effect, would produce a prepolymer having acrylic acid as one of the end capped groups.

Closure of the imidazole ring is effected by dehydrating in situ, i.e., simultaneously with the reaction of the constituents. The ring closure and prepolymer formation reactions must be carried out at temperatures below the polymer reaction temperature, i.e., below about 230° C.

Dehydrating agents used to facilitate the ring closure in the prepolymer reaction may be selected from organic anhydrides, such as acetic anhydride, and also, inert moisture adsorbing agents such as molecular sieves. Organic dehydrating agents are preferred because of their ease of removal from the resin product of the dehydration reaction.

By adjusting the proportions of the tetraamine and the diacid, and end capping with an alicyclic endo diamine instead of a mono acid, a prepolymer may be synthesized having the following structure:

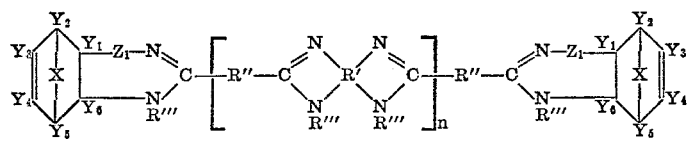

wherein the R's are the same as disclosed above.

While the prepolymers may be synthesized from any aromatic tetraamine and aromatic diacid, the compounds must be capable of reacting together and must remain stable at about 370° C. once they have reacted. Examples of several specific compounds are listed in the following tables.

Typical aromatic tetraamines which may be used in this invention are:

TABLE III 3,3'-diaminobenzidine
1,2,3,5-tetraaminobenzene
3,3',4,4'-tetraaminodiphenyl ether
3,3',4,4'-tetraaminodiphenylmethane
3,3',4,4'-tetraaminodiphenyl sulfone
3,3',4,4'-tetraaminobenzophenone
2,3,6,7-tetraaminonaphthalene
2,3,5,6-tetraaminoindene
3,3',4,4'-tetraaminodiphenylethane
3,3',4,4'-tetraaminodiphenylpropane Typical aromatic diacids which may be used in the practice of this invention are:

TABLE IV phthalic acid
phthalic anhydride
isophthalic acid
isophthalic anhydride
terephthalic acid
terephthalic anhydride
bibenzoic acid
bibenzoic anhydride
2,6-naphthalene dicarboxylic acid
2,6-naphthalene dicarboxylic anhydride It should be understood that esters and half esters of the above acids and anhydrides listed in Table IV will be equally as suitable for use in the present invention. The ester and half ester substituents may be selected from aromatic, e.g. phenyl, or aliphatic, e.g. 1 to 4 carbon atoms, groups. As used in this context, the expression ester means that all carboxylic acid groups have aromatic or aliphatic substituent groups, while half ester means that only half of the carboxylic acid groups have aromatic or aliphatic substituent groups.

Other prepolymers of this invention can be made by reacting an aromatic diacid with an aromatic dihydroxydiamine and end capping with an alicyclic endo monoacid. The polyoxazole prepolymers which are produced are synthesized in the same manner as the polyimidazole prepolymers discussed above except that an aromatic dihydroxydiamine is employed as a constituent in the reaction rather than an aromatic tetraamine. The prepolymer may be represented ideally as follows:

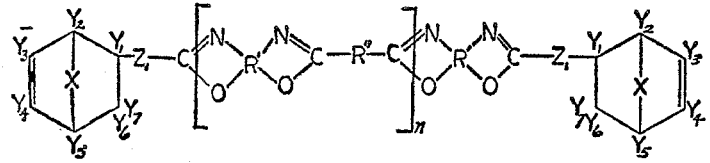

wherein $Z_1$, $Y_1$–$Y_6$, $R'$, $R''$, $X$, and $n$ have been identified above.

Although any aromatic dihydroxydiamine may be used to make the prepolymers of this invention, the same considerations applied to the tetraamine and the diacid above, must be made. The following table sets forth several specific examples of suitable compounds.

Typical aromatic dihydroxydiamines suitable for this invention are:

TABLE V 2,4-dihydroxy-m-phenylene diamine
3,3'-dihydroxybenzidine
bis(3-hydroxy-4-aminophenyl)methane
bis(3-hydroxy-4-aminophenyl) ether
2,3-aminomethyl-1,4-butanediol A prepolymer similar to the polyoxazole discussed above, may be made by substituting an aromatic dithiol diamine in place of the aromatic dihydroxydiamine. Thus, the prepolymer may be synthesized by reacting an aromatic dithioldiamine with an aromatic diacid and an alicyclic endo monoacid to produce the following prepolymer:

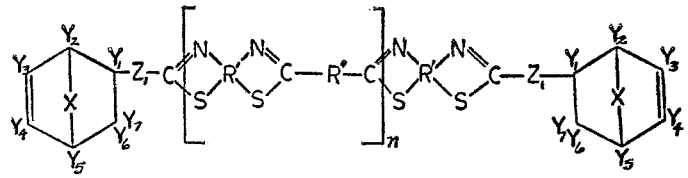

wherein $Z_1$, $Y_1$–$Y_7$, R', R'', and $n$ have been identified above. An alternate way of illustrating the above disclosed prepolymer formulae is:

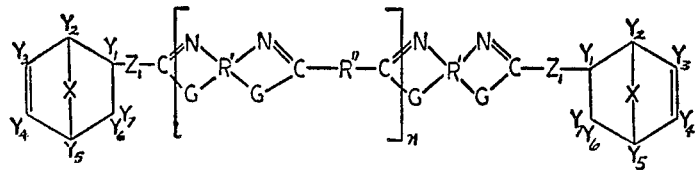

wherein X, $Y_1$–$Y_7$, $Z_1$, R', R'', and $n$ have been previously identified and G is defined as —O—, —S—, or

where R''' has been previously defined.

While any aromatic dithiol diamine will be suitable for preparation of these prepolymers, the same considerations applied to the tetraamine and the diacid above, must be made. Several suitable representative dithiol diamines which may be used are:

TABLE VI 2,4-dithiol-m-phenylene diamine
3,3-dithiolbenzidine
bis(3-thiol-4-aminophenyl)methane
bis(3-amino-4-thiolphenyl)methane
2,3-aminomethyl-1,4-butanedithiol Reaction of the prepolymer to form the polymeric product occurs through the alicyclic endo end capping compounds. While the exact mechanism of the polymeric reaction is not known, it is postulated that a three-dimensional polymer is formed when the prepolymer is subjected to temperature from approximately 230° C. to 370° C. for up to 4 hours. Although it is not necessary for cure, it has been discovered that the application of up to 700 atmospheres is beneficial in removing voids with the resultant improvements in product properties. The cure times, temperatures, and pressures are variables which depend on the composition, mass, and shape of the article being produced. For example, the cure for a large mass of neat resin may require a lower temperature applied for a longer period of time at a higher pressure in order to avoid cracking, incomplete consolidation, or voids, than a thin impregnated glass laminated article or a small article containing up to 80% by weight of inert fillers, such as inorganic salts, metals, or other common filler materials.

While it is preferred that the terminal groups used on the prepolymers of this invention constitute only the alicyclic endo compounds, it has been found that up to about one half of the alicyclic endo compound can be replaced by acrylic acid without materially altering the properties of many of the polymers. Ideally, this provides a prepolymer with an acrylic acid radical end cap at one end of the prepolymer chain and an alicyclic endo end cap at the other.

In order to enhance product properties, crosslinking agents may be incorporated into the polymer chain. Solid or liquid organic compounds having olefinic unsaturation can be added to the initial starting materials while gaseous organic olefins are introduced into the starting material by reaction under pressure up to about 3000 p.s.i. Normally, an amount of crosslinking agent equivalent up to 10% by weight of resin at initiation of cure is used. Specific examples of a few of the gaseous olefinic compounds which are suitable crosslinking agents are ethylene, propylene, halogenated ethylene, halogenated propylene, and halogenated butadiene. Specific examples of liquid olefinic compounds which are suitable crosslinking agents are styrene, cyclopentadiene, furane, crotonic acid, acrylic acid and halogenated, phenyl substituted, or methyl substituted forms thereof. Specific examples of a few of the solid olefinic compounds which are suitable crosslinking agents for purposes of this invention are tetraphenylcyclopentadiene, maleic acid and derivatives, cinnamic acid, and stilbene. In addition to the gaseous, liquid, or solid crosslinking agents, crosslinking sites may be built into the polymer chain by the use of polymer reactants having olefinic substituents; for example, a polyimidazole made from stilbene tetraamine or p-carboxy cinnamic acid. Furthermore, it should be readily apparent to those skilled in the art that various combinations of the above crosslinking agents may be used.

The following examples are illustrative of the procedures used to practice this invention.

EXAMPLE I

Approximately 3.8 grams of 2,3,4,5-tetraphenylcyclopentadiene dissolved in 7 grams of benzene. Approximately 0.8 gram of acrylic acid is added to the solution and mixed thoroughly. The solution is warmed slightly and allowed to stand for 12 hours. Crystals of 2,3,4,5-tetraphenyl-2,5-endooxo-tetrahydrobenzoic acid precipitate from the solution.

EXAMPLE II

Approximately 4.6 grams of 2,3,4,5-tetraphenyl-2,5-endooxo-tetrahydrobenzoic acid, approximately 2.2 grams of 3,3'-diaminobenzidine, and approximately 2.0 grams of phthalic acid chloride are slurried in 300 ml. of dimethylformamide. Approximately 20 grams of acetic anhydride is added to the solution. The resulting mixture is stirred for 3 hours to give a solution of amide-acid prepolymer. The dimethylformamide varnish is stripped of solvent by evaporation on a rotary evaporator under vacuum at 150° C. to give a dry powder. A ceramic dish containing the powder is placed in an oven at 350° C. for 30 minutes and then cooled to room temperature. A brown, rigid, foam-like polymer is formed.

EXAMPLE III

Approximately 4.7 grams of 2,3,4,5-tetraphenyl-2,5-endooxotetrahydrobenzoic acid, approximately 2.0 grams of phthalic acid chloride, and approximately 2.2 grams of 3,3' - dihydroxybenzidine are thoroughly mixed in 300 ml. of dimethylformamide. Approximately 20 grams of acetic anhydride is added to the mixture. The mixture is processed in the same manner as set forth in Example II above. A rigid foam-like polymer is formed upon curing the prepolymer powder.

EXAMPLE IV

Approximately 4.5 grams of 2,3,4,5 - tetraphenyl-2,5-endooxotetrahydrobenzoic acid, approximately 2.1 grams of phthalic acid chloride, and approximately 2.5 grams of 3,3'-dithiolbenzidine are mixed in approximately 300 ml. of dimethylformamide. The mixture is processed in the same manner as set forth in Example II above. The prepolymer powder formed a rigid foam upon curing.

We claim:
1. A method of making a prepolymer comprising reacting in the presence of an organic solvent proper stoichiometric amounts of
   (A) a tetrafunctional aromatic diamine compound wherein the two additional functional groups are selected from the group consisting of dithiol, dihydroxyl, and diamine;
   (B) an aromatic dicarboxylic compound selected from the group consisting of acids anhydrides, esters and half esters;

(C) an end cap compound comprising a substituted alicyclic endo compound having the formula:

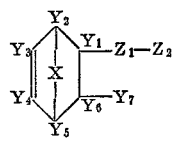

to give a prepolymer having 1 to 20 repeating units, wherein $Y_1$–$Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, oxygen, sulfur, methylene, halogen substituted methylene, alkyl substituted methylene, and aryl substituted methylene; $Z_1$ is selected from the group consisting of an arylene radical and an alkylene radical having 0 to 4 carbon atoms; $Z_2$ is selected from the group consisting of

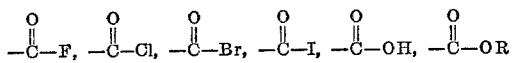

where R is a monovalent aliphatic or aromatic radical, and —$NH_2$; and $Y_7$ is selected from the group consisting of hydrogen, halogen, nitro, aryl, alkyl having 1 to 6 carbon atoms, alkyl ether having 1 to 6 carbon atoms, alkaryl, and amino; in a temperature range of 10° C. to about 200° C.; and (D) dehydrating at temperatures ranging from —18° C. to about 200° C.

2. A method of making a prepolymer according to claim 1 wherein up to one-half of the end cap compound is replaced by acrylic acid.

3. A method of making a prepolymer according to claim 1 wherein the substituted alicyclic endo compound is bicyclo(2.2.1)hept-5-ene-2-carboxylic acid.

4. A method of making a prepolymer according to claim 1 wherein the substituted alicyclic endo compound is bicyclo(2.2.1)hept-5-ene-2,3-diamine.

5. A method of making a prepolymer according to claim 1 wherein the carboxylic compound is selected from the group consisting of aromatic diacids, aromatic anhydrides, aromatic ester, aromatic half ester, aromatic-aliphatic ester having 1 to 4 carbon atoms in the aliphatic radical, and aromatic-aliphatic half ester having 1 to 4 carbon atoms in the aliphatic radical.

6. A method of making a prepolymer according to claim 1 wherein an olefinic crosslinking agent is added.

7. A heterocyclic thermosetting prepolymer having the formula

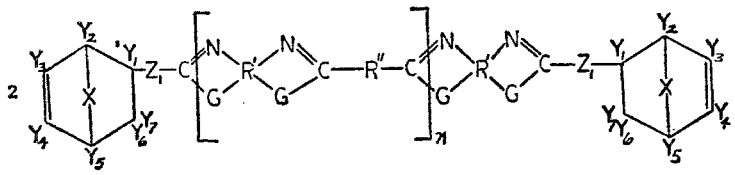

wherein $Y_1$–$Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, oxygen, sulfur, methylene, halogen substituted methylene, alkyl substituted methylene, and aryl substituted methylene; $Z_1$ is selected from the group consisting of an arylene radical and an alkylene radical having 0 to 4 carbon atoms; $Y_7$ is selected from the group consisting of hydrogen, halogen, nitro, aryl, alkyl having 1 to 6 carbon atoms, alkyl ether having 1 to 6 carbon atoms, alkaryl, and amino; R′ is a tetravalent aromatic radical; R″ is a divalent aromatic radical; G is a divalent radical selected from the group consisting of —O—, —S—, and

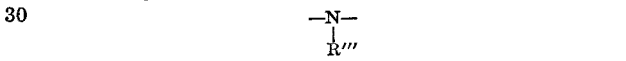

where R‴ is hydrogen or a monovalent aromatic or aliphatic radical; and $n$ is an integer from 1 to 20.

8. A propolymer according to claim 7 wherein one of the end cap compounds is replaced by acrylic acid.

9. A prepolymer according to claim 8 wherein the end caps are bicyclo(2.2.1)hept-5-ene-2-carboxylic acid radicals.

10. A prepolymer according to claim 7 wherein the formula is

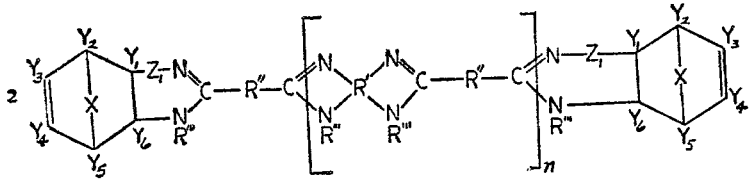

11. A prepolymer according to claim 7 wherein an olefinic crosslinking agent is added.

12. A resin product comprising curing the prepolymer of claim 7.

13. A resin product comprising curing the prepolymer of claim 8.

14. A resin product comprising curing the prepolymer of claim 10.

15. A resin product comprising curing the prepolymer of claim 11.

References Cited
UNITED STATES PATENTS

| | | | |
|---|---|---|---|
| 3,528,950 | 9/1970 | Lubowitz | 260—78.4 |
| 3,316,213 | 4/1967 | Berr | 260—47 |
| 1,944,731 | 10/1933 | Diels et al. | 260—346.6 |

JOSEPH L. SCHOFER, Primary Examiner

J. KIGHT, Assistant Examiner

U.S. Cl. X.R.

260—47 CZ, CP, 78 R, TF, UA, SC, S, 78.4 D, 79; 264—331